US012597997B2

(12) United States Patent
Wong et al.

(10) Patent No.: US 12,597,997 B2
(45) Date of Patent: Apr. 7, 2026

(54) DETERMINATION OF OPTICAL PERFORMANCE OF DISTRIBUTED RAMAN AMPLIFIERS USING DEEP NEURAL NETWORKS

(71) Applicant: Ciena Corporation, Hanover, MD (US)

(72) Inventors: Jeff Gar Don Wong, Nepean (CA); Connie Ruth Sutherland, Nepean (CA); Petar Djukic, Ottawa (CA)

(73) Assignee: Ciena Corporation, Hanover, MD (US)

( * ) Notice: Subject to any disclaimer, the term of this patent is extended or adjusted under 35 U.S.C. 154(b) by 351 days.

(21) Appl. No.: 18/357,237

(22) Filed: Jul. 24, 2023

(65) Prior Publication Data

US 2025/0038844 A1    Jan. 30, 2025

(51) Int. Cl.
H04B 10/079 (2013.01)

(52) U.S. Cl.
CPC ................................ H04B 10/0795 (2013.01)

(58) Field of Classification Search
None
See application file for complete search history.

(56) References Cited

U.S. PATENT DOCUMENTS

| | | | | |
|---|---|---|---|---|
| 10,171,161 | B1 * | 1/2019 | Côté | H04B 10/6161 |
| 2022/0239371 | A1 * | 7/2022 | Xu | H04B 10/0793 |
| 2022/0416495 | A1 * | 12/2022 | Neog | H04B 10/27 |

OTHER PUBLICATIONS

M. Ionescu, A. Ghazisaeidi and J. Renaudier, "Machine Learning Assisted Hybrid EDFA-Raman Amplifier Design for C+L Bands," 2020 European Conference on Optical Communications (ECOC), Brussels, Belgium, 2020, pp. 1-3, doi: 10.1109/ECOC48923.2020. 9333241. (Year: 2020).*
C. Mineto et al., "Performance of Artificial-Intelligence-based Modelling for Distributed Raman Amplification," 2021 SBMO/IEEE MTT-S International Microwave and Optoelectronics Conference (IMOC), Fortaleza, Brazil, 2021, pp. 1-3, doi: 10.1109/IMOC53012. 2021.9624795. (Year: 2021).*
Darko Zibar et al., "Inverse System Design Using Machine Learning: The Raman Amplifier Case," Journal of Lightwave Technology, vol. 38, No. 4, Feb. 15, 2020, 18 pages.
Metodi Plamenov Yankov et al., "Flexible Raman Amplifier Optimization Based on Machine Learning-Aided Physical Stimulated Raman Scattering Model," Journal of Lightwave Technology, vol. 41, No. 2, Jan. 15, 2023, 7 pages.
Gianluca Marcon et al., "Gain Design of Few-Mode Fiber Raman Amplifiers Using an Autoencoder-Based Machine Learning Approach," 978-1-7281-7361-0/20, 2020 IEEE, 4 pages.

* cited by examiner

*Primary Examiner* — Nathan M Cors
(74) *Attorney, Agent, or Firm* — Baratta Law PLLC; Lawrence A. Baratta, Jr.

(57) ABSTRACT

Systems and methods include receiving inputs comprising a Raman gain target for a Raman amplifier, fiber parameters, and fiber characteristics, each for an optical span; analyzing the inputs with a deep neural network (DNN) having a plurality of layers; providing a plurality of outputs from the DNN; and utilizing the plurality of outputs for a link budget calculation on the optical span. The Raman amplifier includes a plurality of pumps each at a fixed wavelength.

18 Claims, 7 Drawing Sheets

C-BAND AND
L-BAND CHANNELS

N RAMAN PUMPS

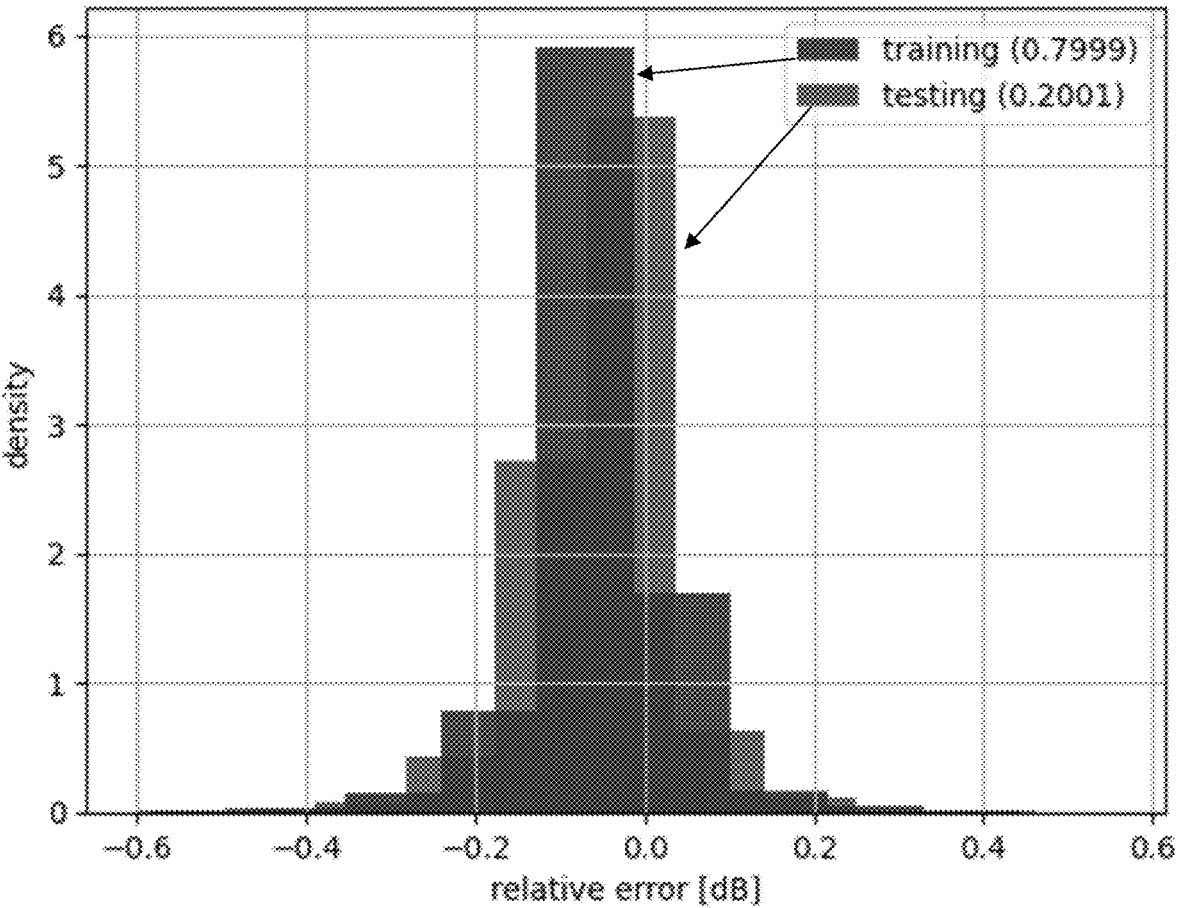
_FIG. 4_

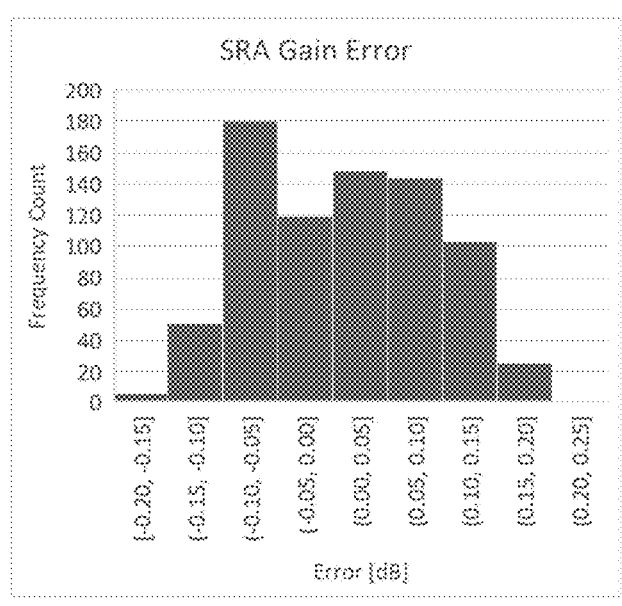
_FIG. 5_
_FIG. 6_
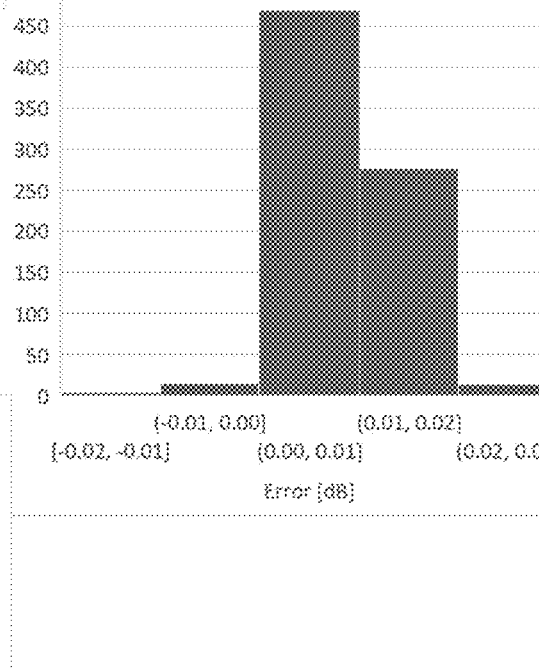
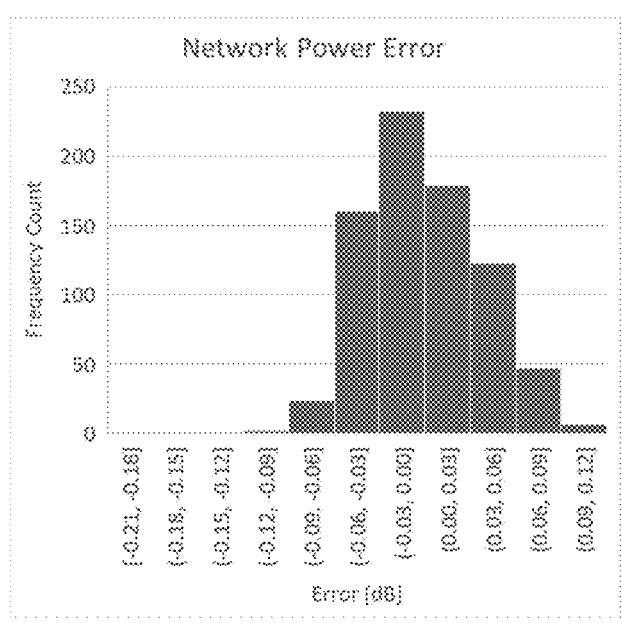
_FIG. 7_

100

RECEIVING INPUTS COMPRISING A RAMAN GAIN TARGET FOR A RAMAN AMPLIFIER, FIBER PARAMETERS, AND FIBER CHARACTERISTICS, EACH FOR AN OPTICAL SPAN ⟋102

ANALYZING THE INPUTS WITH A DEEP NEURAL NETWORK (DNN) HAVING A PLURALITY OF LAYERS ⟋104

PROVIDING A PLURALITY OF OUTPUTS FROM THE DNN ⟋106

UTILIZING THE PLURALITY OF OUTPUTS FOR A LINK BUDGET CALCULATION ON THE OPTICAL SPAN ⟋108

DETERMINATION OF OPTICAL PERFORMANCE OF DISTRIBUTED RAMAN AMPLIFIERS USING DEEP NEURAL NETWORKS

FIELD OF THE DISCLOSURE

The present disclosure relates generally to networking and computing. More particularly, the present disclosure relates to systems and methods for determination of optical performance of distributed Raman amplifiers using deep neural networks.

BACKGROUND OF THE DISCLOSURE

With the continued growth in connectivity, the Internet, cloud services, etc., optical networks continue to experience growth. This includes higher rates, via coherent modulation, polarization multiplexing, etc., as well as use of more spectrum on an optical fiber, i.e., C-band (~1530 nm to 1565 nm) as well as the L-band (~1565 nm to 1625 nm). Even further, deployments are using distributed Raman amplifiers. Distributed Raman amplifiers include one or more pump lasers (generally at about 80 nm less than the signal band of interest), wherein the pump lasers are connected to the fiber plant, using stimulated Raman scattering (SRS) within the fiber, to transfer the energy of higher-frequency pump signals to lower-frequency signals. With multiple bands, e.g., C-band and the L-band, more pump lasers at different wavelengths are needed. Conventionally, there is a challenge in determining pump laser wavelengths and pump laser power settings to achieve a desired amount of Raman gain for all the transmitted signals. Practically, Distributed Raman amplifiers (DRA) are productized having a fixed number of pump lasers at fixed wavelengths, making the challenge more difficult as now only pump laser power settings are considered. Even more challenging, more non-linear interactions in the C-band can manifest for multi-band DRA because of the higher number of pumps.

BRIEF SUMMARY OF THE DISCLOSURE

The present disclosure relates to systems and methods for determination of optical performance of distributed Raman amplifiers using deep neural networks. Conventional approaches rely on simulation and modeling which take significant compute and time resources. Optimization, such as to improve the time, results in reduced accuracy and/or limited application. There is a need to determine proper pump powers as well as whether or not a given link can support a given configuration. Network designers, engineers, and planners need to get quick and accurate results for link budget calculations. The link budget calculations answer the questions—will a given configuration work on a given link, what are the settings of amplifiers, launch powers, channel occupancy and spacing, what is the margin on the given link, what is the Raman gain value (which is correlated to the pump power settings), and the like.

The present disclosure utilizes deep neural networks (DNNs) to calculate all the optical performance quantities relevant for link budget calculations of an actual DRA product quickly and accurately from only the fiber properties of the span and the average Raman gain target value. Additionally, the DNN utilizes classification and regression functions to model the behavior and optical performance of a Reconfigurable Line System C+L-band Single Line Raman Amplifier (RLS C+L-band SRA) product, as it is used in the network. Advantageously, the present disclosure has an average runtime about an order of magnitude better than current solution (tens of seconds vs. the present disclosure which is a couple seconds). Using DNN's reduces the computation time by around an order of magnitude compared to the current method of simulation, and results in fewer compute resources required to simulate the optical performance of DRA, such as in a cloud service, without sacrificing on accuracy or applicability.

In various embodiments, the present disclosure includes a method having steps, a processing device configured to implement the steps, and a non-transitory computer-readable medium storing instructions that, when executed, cause one or more processors to implement the steps. The steps include receiving inputs including a Raman gain target for a Raman amplifier, fiber parameters, and fiber characteristics, each for an optical span; analyzing the inputs with a deep neural network (DNN) having a plurality of layers; providing a plurality of outputs from the DNN; and utilizing the plurality of outputs for a link budget calculation on the optical span. In an embodiment, the Raman amplifier can include a plurality of pumps each at a fixed wavelength. In another embodiment, the Raman amplifier can include a plurality of pumps each at a fixed wavelength, and wherein the Raman amplifier supports amplification across both the C-band and the L-band.

The Raman gain target specifies a gain over a spectrum of interest, and wherein the plurality of outputs include a Raman gain which specifies the gain achieved over the spectrum of interest. The Raman amplifier can include a plurality of pumps each at a fixed wavelength, and wherein the Raman amplifier can be configured to set a pump power of each of the plurality of pumps based on the Raman gain target. The plurality of outputs can include any of achieved Raman gain ($G(n)$), an effective noise figure ($NF_{eff}(n)$), an incremental multi-path interference ($\Delta MPI(n)$) for each signal band frequency ($n$), and a gain experienced by an Optical Service Channel (OSC). The steps can further include performing a simulation based on non-linear effects, hardware specifications of the Raman amplifier, and software control of the Raman amplifier to obtain a set of training data; and training the DNN with the set of training data.

The Raman amplifier can operate in a plurality of operating modes and switching between two of the plurality of operating modes causes a discontinuity in performance of the Raman amplifier. The DNN can include one or more classification layers to identify an operating mode of the plurality of operating modes, followed by one or more regression layers to receive outputs from the one or more classification layers and provide the plurality of outputs of the DNN. The Raman amplifier can include a plurality of pumps each at a fixed wavelength, and wherein the Raman amplifier supports amplification of channels across both the C-band and the L-band, with the plurality of operating modes configured to minimize undesirable interference between the plurality of pumps and the channels in either of the C-band and the L-band.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a graph of the distribution of an example DNN's relative error in frequency-dependent gain across the C- and L-band frequency range.

FIGS. 5 to 7 are graphs of gain error, network receiver optical signal-to-noise ratio (OSNR) error, and receiver power error, from using an example DNN to model a network with two 110 km spans of NDSF amplified with the fixed C+L-band Raman amplifier.

DETAILED DESCRIPTION OF THE DISCLOSURE

Again, the present disclosure relates to systems and methods for determination of optical performance of distributed Raman amplifiers using deep neural networks. The present disclosure utilizes deep neural networks (DNNs) to calculate all the optical performance quantities relevant for link budget calculations of an actual DRA product quickly and accurately from only the fiber properties of the span and the average Raman gain target value. The calculated quantities can include the Raman gain spectrum, effective noise figure ($NF_{eff}$) of the spectrum, incremental multi-path interference ($\Delta$MPI) of the spectrum, and optical service channel (OSC) gain. Generally, the Raman pump powers are needed to calculate these quantities. With our approach, the pump powers are not required as an input to the DNN. This is because the reference simulation that produced the training data sets implements a pump power tuning algorithm; the pump powers are implicitly included in the resulting Raman optical performance quantities.

Additionally, the DNN utilizes classification and regression functions to model the behavior and optical performance of a Reconfigurable Line System C+L-band Single Line Raman Amplifier (RLS C+L-band SRA) product, as it is used in the network. The training data set includes considerations for the hardware specifications of the DRA product which includes different operating modes which are used to mitigate four-wave mixing (FWM) penalties that arise from the Raman pumps. The operating modes create discontinuities in the behavior of the Raman gain, noise figure, and $\Delta$MPI profiles, and these are modeled in the trained classification and regression functions of the DNN. Of note, classical DNNs require smooth data; the discontinuities create problems in data, which need to be accounted for.

Example Optical Network

Figure 1:
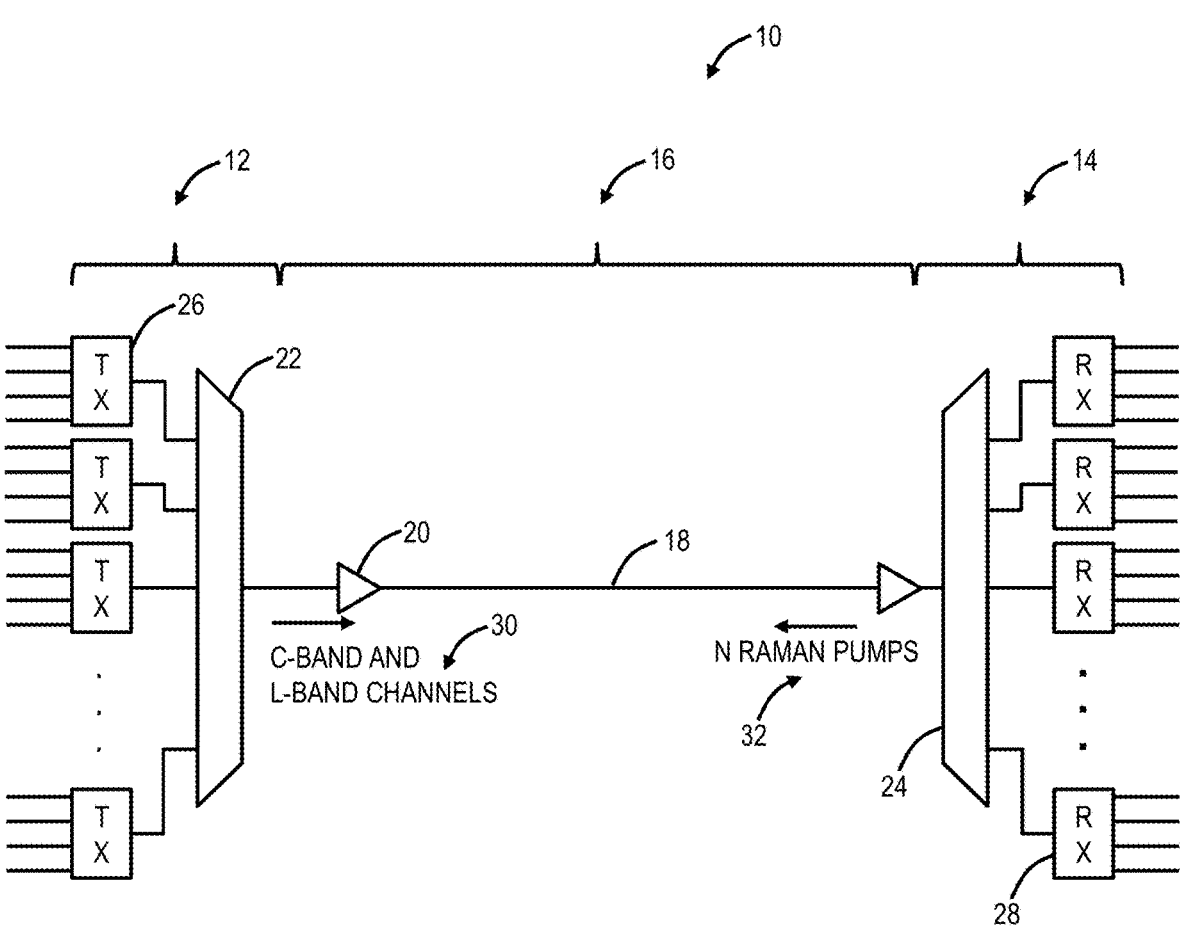
FIG. 1 is a network diagram of an optical network illustrating a single optical multiplex section (OMS) for describing distributed Raman amplification.

FIG. 1 is a network diagram of an optical network 10 illustrating a single optical multiplex section (OMS) for describing distributed Raman amplification. For illustration purposes, the optical network 10 is shown with a single direction from a first reconfigurable optical add/drop multiplexer (ROADM) 12 to a second ROADM 14. Of course, a practical embodiment will include the opposite direction, for bidirectional communications. The optical network 10 generally includes, from a topology perspective, terminal and wavelength selection equipment at the ROADMs 12, 14 and an optical line system 16 interconnecting the ROADMs 12, 14. The optical line system 16 generally includes a fiber cable 18 optical amplifiers 20, and the like. The ROADMs 12, 14 can include degree components, such as wavelength selective switches 22, 24, pre/post amplifiers, OSC, optical channel monitors (OCMs), and the like. The ROADMs 12, 14 can include multiple transmitters (TX) 26 and receivers (RX) 28 that interconnect over the optical line system 16.

The ROADM 12 is configured to transmit, from left to right in FIG. 1, C-band and L-band channels 30. These can be traffic-carrying signals anywhere in the C- or L-band spectrum. Over the fiber cable 18, distributed Raman amplifiers (DRA) include multiple Raman pumps 32 used to provide optical signal gain for high loss fiber spans. A DRA injects high frequency light into the fiber cable 18 at high power levels. Through Stimulated Raman Scattering (SRS), the propagating signals experience a gain distributed along the length of the fiber. Normally the power of channels 30 propagating in the forward direction will decrease along the length of the fiber cable 18. In a counter-propagating approach, the DRA is placed at the egress and the Raman pump 32 powers are injected into the fiber cable 18 in the backward direction. With this approach, the channel powers will experience a gain as it approaches the egress of the fiber cable 18.

Of note, the C-band is about 1530 nm to 1565 nm and the L-band is about 1565 nm to 1625 nm, covering about 100 nm of spectrum. As such, there is a requirement for multiple Raman pumps 32 to create gain across this spectrum.

Modeling and Simulation

For optical network planning and design, the impact of DRA on the optical performance of the channels 30 needs to be simulated. The simulation would calculate the gain, incremental noise, and incremental multipath interference ($\Delta$MPI) due to the DRA which are frequency dependent quantities. Additionally, the simulation would determine the power of the Raman pumps 32 used by the DRA. These output values depend on the gain target, fiber type, fiber attenuation coefficient, fiber span loss, and hardware and software details of the DRA.

Conventional simulation of the DRA involves solving a set of coupled ordinary differential equations (ODE). There are boundary conditions at both ends of the fiber cable 18: signal power at fiber ingress and Raman pump power at fiber egress. An iterative procedure is used to satisfy both boundary conditions for a given Raman pump power condition. Another iterative procedure is needed to map between gain target and pump powers. This simulation takes significant time to complete and is also computationally intensive.

Of note, each OMS is an all-optical section between the ROADMs 12, 14 and managed as a single link. In a practical application, an optical network can include multiple OMSs and there is a need to plan and engineer the optical network prior to deployment, for purposes of equipment ordering, engineering specifications, etc. Generally, this process requires running the conventional simulation of the DRA, as well as other calculations for other aspects. With the conventional simulation, the time is around 20 seconds or so for each OMS. This is time consuming given a practical network may have tens or hundreds of sections.

Besides modeling the DRA with the physical equations in the conventional simulation, it is possible to develop a model based on experimental measurements. Approximation methods can also be developed where the DRA is simulated with an erbium doped fiber amplifier (EDFA)-like model derived from polynomial fits of either measured or simulated data.

The main shortcoming of simulating the DRA using the physical equations is the compute and time resources required. Attempts to improve this usually leads to reduced accuracy or limited applicability. Using models based on experimental measurements is limited in applicability because of the small size of measured data sets. Also, polynomial fitting of simulation results is not possible due to discontinuities in the data, due to the presence of both the C-band and the L-band. This prevents the development of an EDFA-like model using this approach.

Network Planning and Design Application

The DRA simulation is required in network planning software or a cloud service to determine the effects of DRA on transmitted signals. In the present disclosure, the simulation inputs are the required gain and fiber and network configuration parameters. The outputs of the simulation are the Raman pump operating conditions and the key optical parameters in determining linear effects on the transmission. In particular, the effects include the amplification gain on the signal (G(n)) and the effective noise figure ($NF_{eff}$(n)) which is related to the increase in the noise due to the amplifications. The network planning software or service uses output channel spectrum gain and noise figure information to determine the link budget for the transmitted signals.

Approximation Models

Due to the long calculation times required to iteratively solve the Raman ODEs, approximation methods have been adopted in the past. One approximation technique is an interpolation model based on laboratory measurements. These models often have limited applicability because of the small size of measured data sets.

Another approach is to model the DRA as if it was an Erbium-doped fiber amplifier (EDFA). This changes the modeling of the amplification process from being distributed to being lumped at the fiber egress. This lumped model for the DRA is derived by fitting polynomials to the gains and noise figures from the ODE solutions. The applicability of this approximation model is limited due to the number of ODE solutions used in the polynomial fits and the accuracy of the fits.

DNN-Based Approaches

DNNs have also been used to either model Raman amplifiers or to design new Raman amplifiers. This includes allowing the Raman pump wavelengths as one of the outputs of the DNNs. This works fine when designing new Raman amplifiers, but not for an existing product with fixed Raman pump wavelengths. The previous approaches with DNNs have been used to estimate the Raman pump powers as outputs using gain profiles as input. Alternatively, the DNNs require the Raman pump powers as inputs to calculate only the gain profile without other quantities of interest such as $NF_{eff}$ and ΔMPI profiles.

See, e.g., Yankov, Metodi Plamenov, et al. "Flexible Raman Amplifier Optimization Based on Machine Learning-Aided Physical Stimulated Raman Scattering Model." Journal of Lightwave Technology 41.2 (2023): 508-514. This paper is trying to optimize the frequency, powers, and even the number of Raman pumps for systems that use both forward and backward propagating Raman pumps. With such degrees of freedom, this is about designing a new Raman amplifier. This paper makes use of 2 DNNs. The first DNN is to model the Raman gain coefficient which is a property of the optical fiber. The second DNN models the gain of the backward propagating Raman pumps and requires the backward pump frequencies and powers as input.

This does not account for an existing product where the number of Raman pumps and their frequencies are already fixed. As in many other studies, the Raman pump powers are either an input to the model or the desired output of the model. The present disclosure is different in that the pump powers are not required as input or output, and the present disclosure does not use or need a DNN to model the Raman gain coefficient. Also, this paper only considers the C-band where our work is for both C-band and L-band.

Also, see, e.g., Marcon, Gianluca, et al. "Gain design of few-mode fiber Raman amplifiers using an autoencoder-based machine learning approach." 2020 European Conference on Optical Communications (ECOC). IEEE, 2020. This paper is also designing a new counter-propagating Raman amplifier. This amplifier is for few-mode fibers and multi-core fibers. This paper uses a DNN to map between desired Raman gain profile to pump frequency and powers. Then the pump frequencies and powers are fed into a conventional fiber model to assess how accurate the gain profile is compared to the initial desired target profile. Similar to above, this is about a new Raman amplifier, not for an existing product where the pump frequencies are already fixed. Pump powers are a desired output of the DNN used in this paper.

Also, see Zibar, Darko, et al. "Inverse system design using machine learning: the Raman amplifier case." Journal of Lightwave Technology 38.4 (2019): 736-753. Similar to above, this paper provides an approach to adjust Raman pump powers and wavelengths, namely designing a new Raman amplifier. This does not account for an existing product where the number of Raman pumps and their frequencies are already fixed.

Fixed C+L-Band Raman Amplifier

The present disclosure is described with reference to a fixed C+L-band Raman amplifier that supports channels in both the C-band and the L-band frequency ranges, to provide gain across both bands. With this fixed C+L-band Raman amplifier, engineers, operators, technicians, etc. ("user") do not directly control the pump powers or the pump wavelengths of the fixed C+L-band Raman amplifier. Instead, the user specifies the fiber type of the span connected to the fixed C+L-band Raman amplifier and they provision an average gain target value. The software of the fixed C+L-band Raman amplifier will automatically control and tune its Raman pump powers to provide the desired performance.

In advance, the number of Raman pumps used in the fixed C+L-band Raman amplifier and their optical frequencies (wavelengths) were chosen (and are fixed) to minimize the gain variation across the entire frequency range (i.e., 1530-1625 nm) in a sample of representative applications. Since more Raman pumps are needed to amplify both the C-band and L-band, non-linear optical effects such as four-wave mixing (FWM) may become an issue. To mitigate these penalties, the fixed C+L-band Raman amplifier uses different modes of operation depending on the conditions. As described herein, the modes of operation of the fixed C+L-band Raman amplifier determine configuration of the Raman pumps, including, e.g., power, and the like. Switching between these operating modes results in discontinuities in the optical performance of the fixed C+L-band Raman amplifier.

Figure 2:
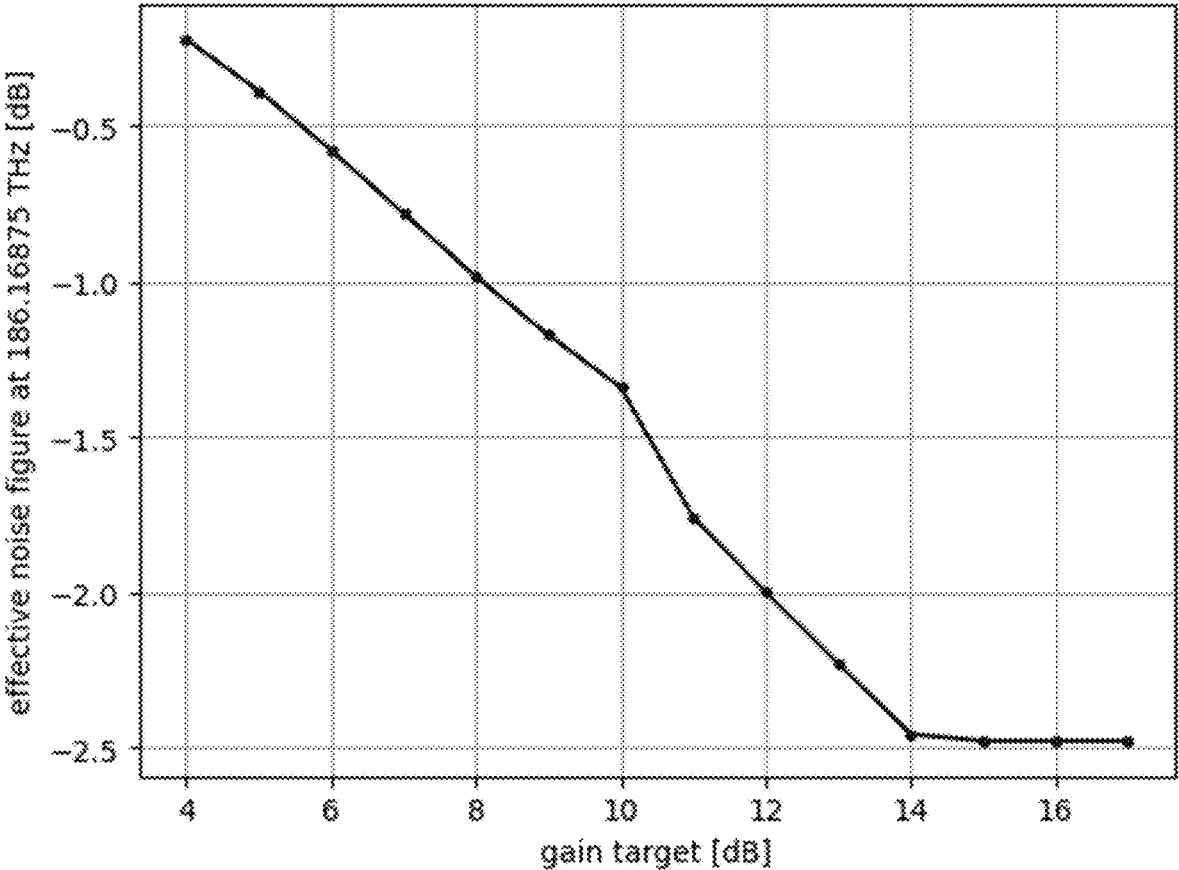
FIG. 2 is a graph of effective noise figure as a function of average gain target for the fixed C+L-band Raman amplifier at 186.16875 THz for 20 dB non-dispersion shifted fiber (NDSF) fiber with an attenuation coefficient of 0.3 dB/km.

FIG. 2 is a graph of effective noise figure as a function of average gain target for the fixed C+L-band Raman amplifier at 186.16875 THz for 20 dB non-dispersion shifted fiber (NDSF) fiber with an attenuation coefficient of 0.3 dB/km. The discontinuities in the noise figure behavior can be seen as the fixed C+L-band Raman amplifier switches modes. Polynomial fitting to derive a lumped model is not possible for the fixed C+L-band Raman amplifier due to these discontinuities in the data. A different approach is needed to avoid solving the Raman ODEs.

DNN Approach for C-Band and L-Band with Fixed Raman Pump Wavelengths

Figure 3:
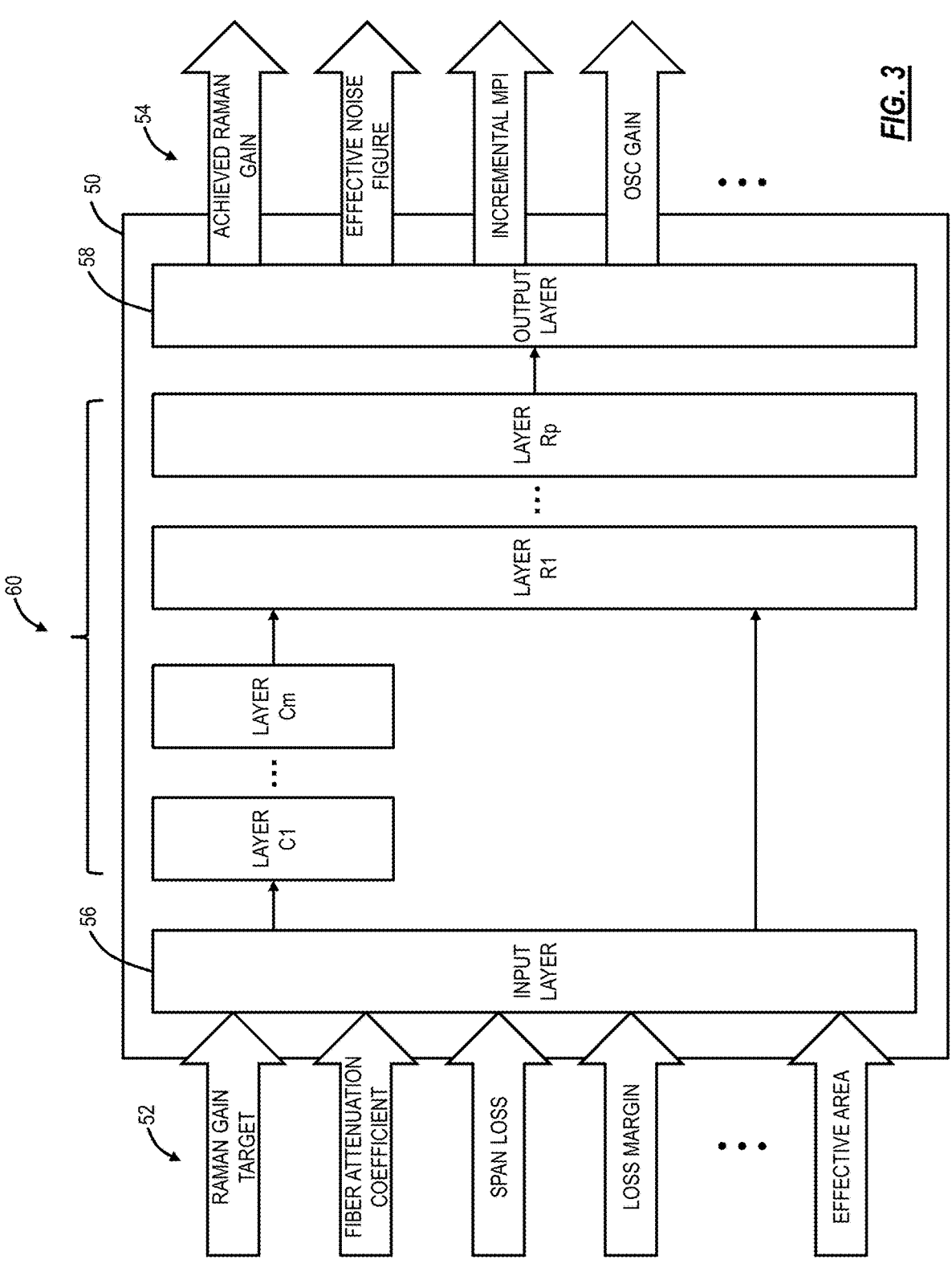
FIG. 3 is a block diagram of a DNN for modeling a fixed C+L-band Raman amplifier.

FIG. 3 is a block diagram of a DNN 50 for modeling the fixed C+L-band Raman amplifier. The proposed solution addresses the limitations of previous and known solutions. Specifically, the fixed C+L-band Raman amplifier is modeled with a simulation that is used to generate results covering the entire application space. This data set is used to train the DNN 50, and this enables the DNN 50 to avoid the problem of limited applicability that other approaches are subject to. The DNN is trained until the difference in calculated results relative to the reference simulation results are within an acceptable bound so that there is no penalty in accuracy.

The simulation models the behavior of the fixed C+L-band Raman amplifier when it is auto-calibrated and tuned and the simulation includes considerations for different operating modes of the device and for hardware specifications. The simulation will show the resulting discontinuities in the data set used to train the DNN 50. The DNN 50 combines classification and regression functions. The classification function determines the operating mode of the fixed C+L-band Raman amplifier, and this is used as additional information for the regression functions that calculate the optical performance quantities of the fixed C+L-band Raman amplifier. This enables the DNN 50 to model the discontinuities in the data for the fixed C+L-band Raman amplifier that polynomial fitting cannot handle.

The simulation implements the same pump power tuning algorithm as used in the fixed C+L-band Raman amplifier. Therefore, the pump powers are implicitly included in the Raman optical performance quantities in the resulting training data set. Because of this, the pump powers are not required as inputs to the DNN 50 to calculate the optical performance quantities.

The DNN 50 includes inputs 52 that include Raman gain target and fiber parameters including the fiber attenuation coefficient, the fiber span loss, the fiber loss margin, etc. The DNN 50 would also require the fiber characteristics such as fiber effective area, zero chromatic dispersion wavelength, fiber attenuation at Raman pump frequencies, and the peak of the Raman gain coefficient function. Thus, the DNN 50 in the present disclosure only requires inputs of the Raman gain target, the fiber parameters, and the fiber characteristics. The Raman gain target can be specified in dB, e.g., 10 dB. Again, as described herein, the fixed C+L-band Raman amplifier includes logic to take a given Raman gain target and determine the appropriate power settings of the pumps. For a description of the Raman gain target setting with multiple pumps, see U.S. Pat. No. 10,263,386, entitled "Four-wave mixing reduction due to Raman pumps in optical communication systems," the contents of which are incorporated by reference in their entirety. The fiber parameters are based on the physical fiber link, distance, etc. All of these inputs 52, Raman gain target, fiber parameters, and fiber characteristics, are known in advance.

In return, the DNN 50 will calculate outputs 54 including the achieved Raman gain (G(n)), the effective noise figure ($NF_{eff}(n)$), and the incremental multi-path interference ($\Delta MPI(n)$) for each signal band frequency (n). It will also calculate the gain experienced by the Optical Service Channel (OSC). These are the quantities of interest for link budget calculations, i.e., for a network planner, designer, or engineer performing the analysis.

The DNN 50 includes an input layer 56, an output layer 58, and a plurality of intermediate layers 60 (layer $C_1$ to $C_m$, and layers $R_1$ to $R_p$). To address operating modes and tuning behavior of the fixed C+L-band Raman amplifier, as described in the previous section, the DNN 50 combines classification and regression functions. The classifier functions are indicated by the layers labeled as $C_1$ to $C_m$. The layers labeled as $R_1$ to $R_p$ are layers for the regression functions. The classification functions are used to identify the fixed C+L-band Raman amplifier operating mode. The operating mode is then used as an additional input to the regression functions that calculate G(n), $NF_{eff}(n)$, and $\Delta MPI$ (n), where n is a channel.

The DNN 50 is trained to map between the input parameters to the output values using corresponding results calculated from simulations based on the physical equations. The reference simulation considers the non-linear fiber optic effects of the fixed C+L-band Raman amplifier and the hardware specifications of the fixed C+L-band Raman amplifier. The reference simulation also mimics the behavior of the control software of the fixed C+L-band Raman amplifier. This means that the reference simulation tunes the Raman pump powers based on the fiber type and target average gain value in the same manner as the actual product.

The training objective is to minimize the mean squared error (MSE) between the DNN 50 and simulation results to an acceptable tolerance. The DNN 50 design is optimized by tuning model hyper-parameters such as the number of layers 56, 58, 60 and the number of nodes used in each layer.

Experimental Results

An example DNN 50 was trained with a preliminary data set for NDSF. This data set included 5000 scenarios. FIG. 4 is a graph of the distribution of an example DNN's relative error in frequency-dependent gain across the C- and L-band frequency range. The training distribution shows the error for the 80% of the preliminary data used to train the DNN. The testing distribution shows the error of the remaining 20% of the data used for testing. The error in gain is within +/−0.6 dB. It is expected that the accuracy would improve when the final data set is used to train the DNN and after the hyper-parameters of the DNN are tuned.

This example DNN 50 was used to model a network with two 110 km spans of NDSF amplified with the fixed C+L-band Raman amplifier, the overall error in the gain, receiver power, and receiver optical signal-to-noise ratio (OSNR) is less than 0.25 dB, see FIGS. 5 to 7.

REST API Service

In an embodiment, the DNN 50 can be provided as a micro-service with a Representational State Transfer (REST) application programming interface (API). The REST API allows users to invoke and to retrieve calculation results. As a micro-service, the DNN 50 can be used in parallel and in scale and across various products. The benefit of this approach is the ability to reduce the computational and time resources needed for the design and planning of optical networks that require the fixed C+L-band Raman amplifier. As this can be a cloud-based served, this translates to reduced costs to perform these simulations. Network designs are often time sensitive. This approach also enables to respond to customer requests in a timely manner.

The following table shows the runtime improvement in using a DNN 50 to model the fixed C+L-band Raman amplifier compared to a conventional model (baseline). An improvement of over 90% is achieved for a simulation of a single-span link equipped with the fixed C+L-band Raman amplifier.

| | Baseline | DNN approach | Improvement |
|---|---|---|---|
| Network runtime (sec.) | 26.9 | 2.8 | 91% |

DNN Process

Figure 8:
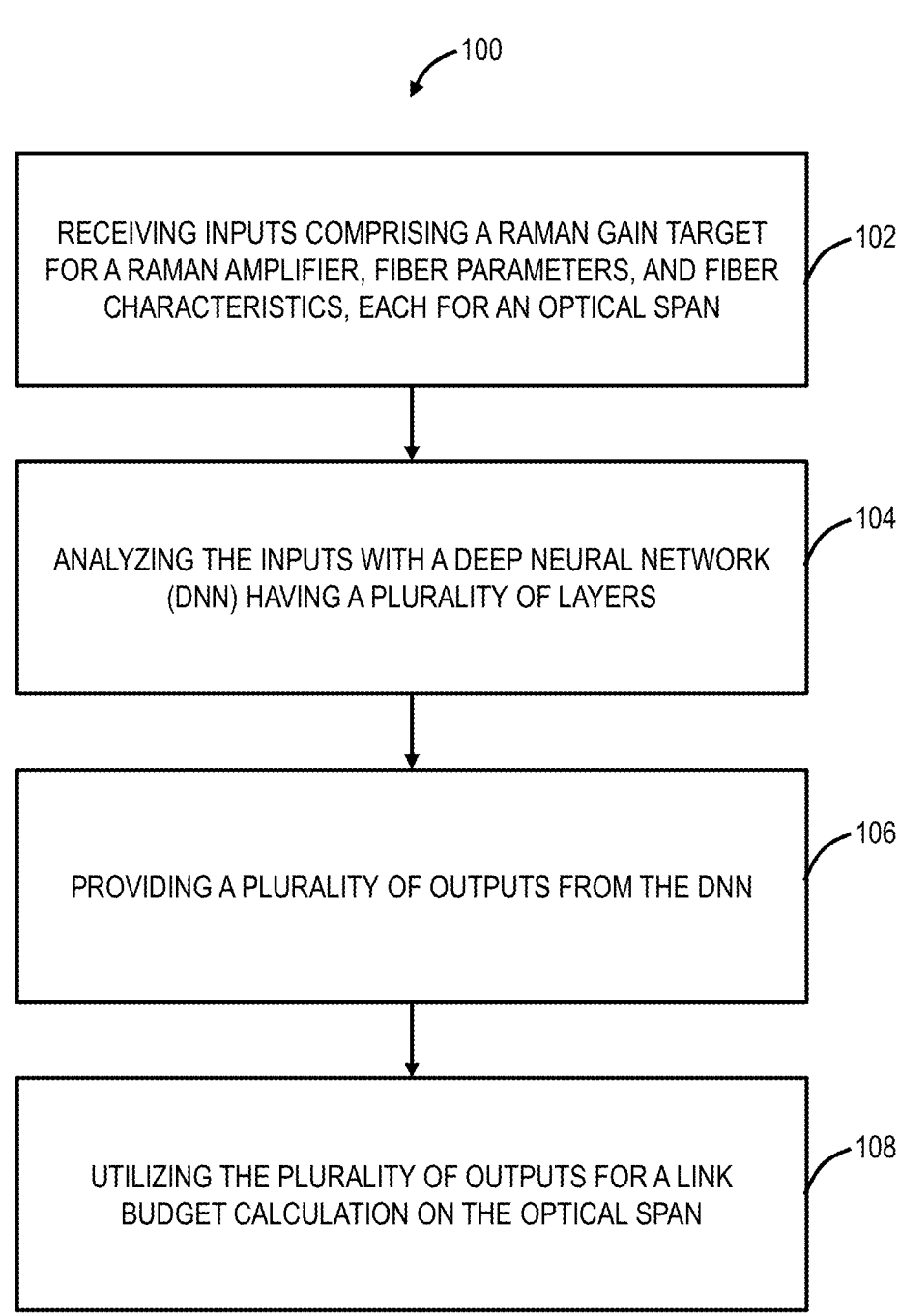
FIG. 8 is a flowchart of a process for determining optical performance of a fixed C+L-band Raman amplifier using a deep neural network (DNN).

FIG. 8 is a flowchart of a process 100 for determining optical performance of a fixed C+L-band Raman amplifier using a deep neural network (DNN). The process 100 contemplates implementation as a method having steps, via a processing device 200 configured to implement the steps, via a cloud service configured to implement the steps, and as a non-transitory computer-readable medium with instructions that, when executed, cause one or more processors to implement the steps.

The process 100 includes receiving inputs comprising a Raman gain target for a Raman amplifier, fiber parameters, and fiber characteristics, each for an optical span (step 102); analyzing the inputs with a deep neural network (DNN) having a plurality of layers (step 104); providing a plurality of outputs from the DNN (step 106); and utilizing the plurality of outputs for a link budget calculation on the optical span (step 108). The Raman amplifier includes a plurality of pumps each at a fixed wavelength, and the Raman amplifier can support amplification across both the C-band and the L-band.

The Raman gain target specifies a gain over spectrum of interest, and the plurality of outputs can include a Raman gain which specifies the gain achieved over the spectrum of interest, i.e., the Raman gain target is the input whereas Raman gain is the achieved output. The Raman amplifier includes a plurality of pumps each at a fixed wavelength, and the Raman amplifier can be configured to set a pump power of each of the plurality of pumps based on the target Raman gain. The plurality of outputs can include any of achieved Raman gain ($G(n)$), an effective noise figure ($NF_{eff}(n)$), an incremental multi-path interference ($\Delta MPI(n)$) for each signal band frequency ($n$), and a gain experienced by an Optical Service Channel (OSC).

The Raman amplifier can operate in a plurality of operating modes and switching between two of the plurality of operating modes causes a discontinuity in performance of the Raman amplifier. The DNN can include one or more classification layers to identify an operating mode of the plurality of operating modes, followed by one or more regression layers to receive outputs from the one or more classification layers and provide the plurality of outputs. The Raman amplifier can include a plurality of pumps each at a fixed wavelength, and wherein the Raman amplifier supports amplification across both the C-band and the L-band, with the plurality of operating modes configured to minimize undesirable interference between the plurality of pumps and channels in either of the C-band and the L-band.

The process 100 can further include performing a simulation based on non-linear effects, hardware specifications of the Raman amplifier, and software control of the Raman amplifier to obtain a set of training data; and training the DNN with the training data.

Example Processing Device Architecture

Figure 9:
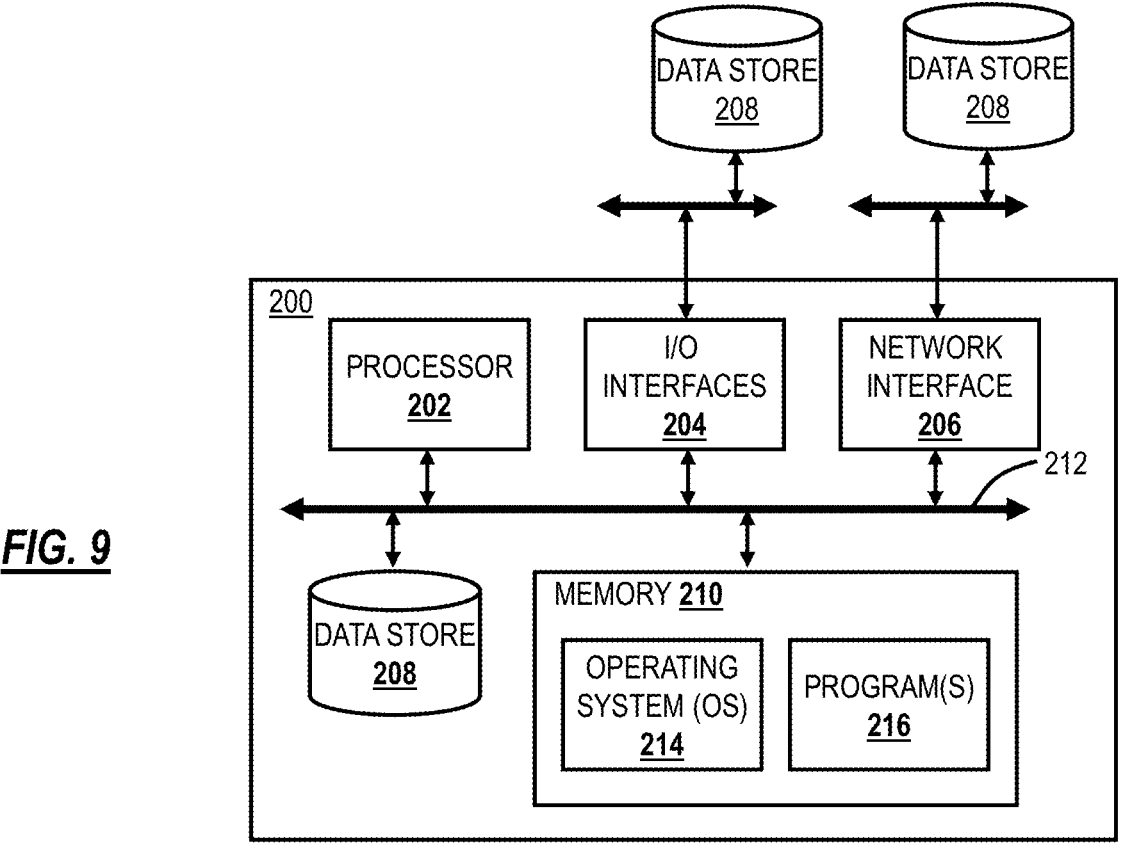
FIG. 9 is a block diagram of a processing device.

FIG. 9 is a block diagram of a processing device 200. The processing device 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the processing device 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory 210, to communicate data to and from the memory 210, and to generally control operations of the processing device 200 pursuant to the software instructions. The I/O interfaces 204 may be used to receive user input from and/or for providing system output to one or more devices or components.

The network interface 206 may be used to enable the processing device 200 to communicate on a network, such as the Internet. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing device 200, such as, for example, an internal hard drive connected to the local interface 212 in the processing device 200. Additionally, in another embodiment, the data store 208 may be located external to the processing device 200 such as, for example, an external hard drive connected to the I/O interfaces 204 (e.g., SCSI or USB connection). In a further embodiment, the data store 208 may be connected to the processing device 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

In an embodiment, the process 100 can be implemented via the processing device 200, via a cloud service that can include one or more processing devices 200, and the like.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections may include headers for various embodiments and those skilled in the art will appreciate these various embodiments may be used in combination with one another as well as individually. Further, it is noted that the various elements, operations, steps, methods, processes, algorithms, functions, techniques, etc. described herein can be used in any and all combinations with one another.

What is claimed is:

1. A non-transitory computer-readable medium comprising instructions that, when executed, cause one or more processors to perform steps of:

receiving inputs comprising a Raman gain target for a Raman amplifier, fiber parameters including any of fiber attenuation coefficient, fiber span loss, and fiber loss margin, and fiber characteristics including any of fiber effective area, zero chromatic dispersion wavelength, fiber attenuation at Raman pump frequencies, and a peak Raman gain coefficient value, each for an optical span;

analyzing the inputs with a deep neural network (DNN) having a plurality of layers;

providing a plurality of outputs from the DNN, the outputs including any of a calculated Raman gain spectrum, an effective noise figure, an incremental multi-path interference ($\Delta$MPI), and an Optical Service Channel (OSC) gain; and utilizing the plurality of outputs for a link budget calculation including determination of amplifier settings, launch powers, channel occupancy, spacing, and performance margin for the optical span.

2. The non-transitory computer-readable medium of claim 1, wherein the Raman amplifier includes a plurality of pumps each at a fixed wavelength.

3. The non-transitory computer-readable medium of claim 1, wherein the Raman amplifier includes a plurality of pumps each at a fixed wavelength, and wherein the Raman amplifier supports amplification across both the C-band and the L-band.

4. The non-transitory computer-readable medium of claim 1, wherein the Raman gain target specifies a gain over a spectrum of interest, and wherein the plurality of outputs include a calculated Raman gain representing an expected gain achieved over the spectrum of interest.

5. The non-transitory computer-readable medium of claim 1, wherein the Raman amplifier includes a plurality of pumps each at a fixed wavelength, and wherein the Raman amplifier is configured to set a pump power of each of the plurality of pumps based on the Raman gain target.

6. The non-transitory computer-readable medium of claim 1, wherein the Raman amplifier operates in a plurality of operating modes and switching between two of the plurality of operating modes causes a discontinuity in performance of the Raman amplifier.

7. The non-transitory computer-readable medium of claim 6, wherein the DNN includes one or more classification layers to identify an operating mode of the plurality of operating modes, followed by one or more regression layers to receive outputs from the one or more classification layers and provide the plurality of outputs of the DNN.

8. The non-transitory computer-readable medium of claim 6, wherein the Raman amplifier includes a plurality of pumps each at a fixed wavelength, and wherein the Raman amplifier supports amplification of channels across both the C-band and the L-band, with the plurality of operating modes configured to minimize undesirable interference between the plurality of pumps and the channels in either of the C-band and the L-band.

9. The non-transitory computer-readable medium of claim 1, wherein the steps further include performing a simulation based on non-linear effects, hardware specifications of the Raman amplifier, and software control of the Raman amplifier to obtain a set of training data; and training the DNN with the set of training data.

10. A method comprising steps of:

receiving inputs comprising a Raman gain target for a Raman amplifier, fiber parameters including any of fiber attenuation coefficient, fiber span loss, and fiber loss margin, and fiber characteristics including any of fiber effective area, zero chromatic dispersion wavelength, fiber attenuation at Raman pump frequencies, and a peak Raman gain coefficient value, each for an optical span;

analyzing the inputs with a deep neural network (DNN) having a plurality of layers;

providing a plurality of outputs from the DNN, the outputs including any of a calculated Raman gain spectrum, an effective noise figure, an incremental multi-path interference ($\Delta$MPI), and an Optical Service Channel (OSC) gain; and utilizing the plurality of outputs for a link budget calculation including determination of amplifier settings, launch powers, channel occupancy, spacing, and performance margin for the optical span.

11. The method of claim 10, wherein the Raman amplifier includes a plurality of pumps each at a fixed wavelength.

12. The method of claim 10, wherein the Raman amplifier includes a plurality of pumps each at a fixed wavelength, and wherein the Raman amplifier supports amplification across both the C-band and the L-band.

13. The method of claim 10, wherein the Raman gain target specifies a gain over a spectrum of interest, and wherein the plurality of outputs include a calculated Raman gain representing an expected the gain achieved over the spectrum of interest.

14. The method of claim 10, wherein the Raman amplifier includes a plurality of pumps each at a fixed wavelength, and wherein the Raman amplifier is configured to set a pump power of each of the plurality of pumps based on the Raman gain target.

15. The method of claim 10, wherein the Raman amplifier operates in a plurality of operating modes and switching between two of the plurality of operating modes causes a discontinuity in performance of the Raman amplifier.

16. The method of claim 15, wherein DNN includes one or more classification layers to identify an operating mode of the plurality of operating modes, followed by one or more regression layers to receive outputs from the one or more classification layers and provide the plurality of outputs of the DNN.

17. The method of claim 15, wherein the Raman amplifier includes a plurality of pumps each at a fixed wavelength, and wherein the Raman amplifier supports amplification of channels across both the C-band and the L-band, with the plurality of operating modes configured to minimize undesirable interference between the plurality of pumps and the channels in either of the C-band and the L-band.

18. The method of claim 10, wherein the steps further include performing a simulation based on non-linear effects, hardware specifications of the Raman amplifier, and software control of the Raman amplifier to obtain a set of training data; and training the DNN with the set of training data.

\* \* \* \* \*